(No Model.) 3 Sheets—Sheet 1.
H. HIRSCH.
SCREW PROPELLER.
No. 246,506. Patented Aug. 30, 1881.
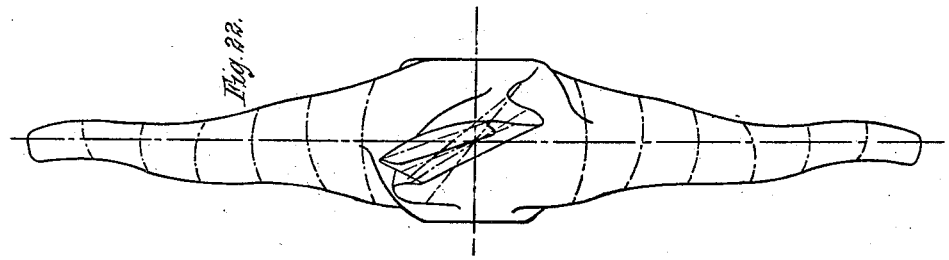
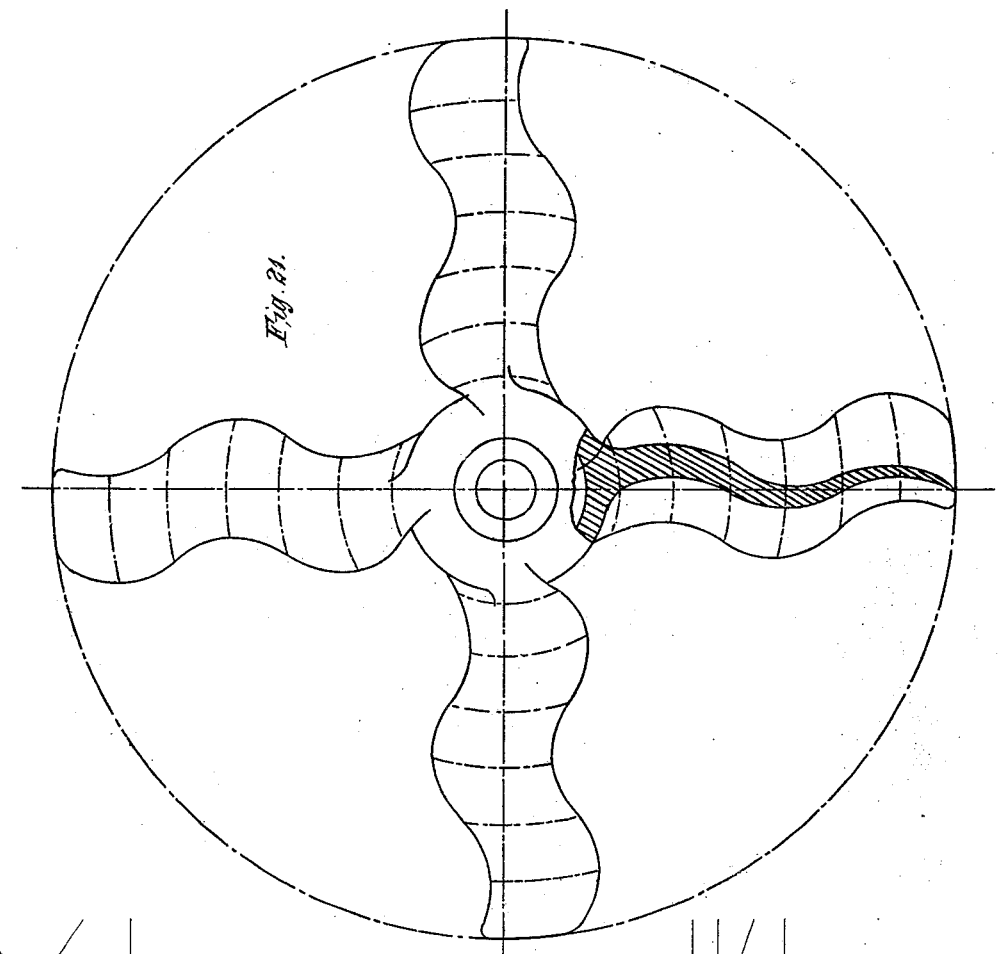
WITNESSES
Charles R. Searle.
P. E. D. Stafford
INVENTOR
Hermann Hirsch
by his attorney
J. D. Stetson

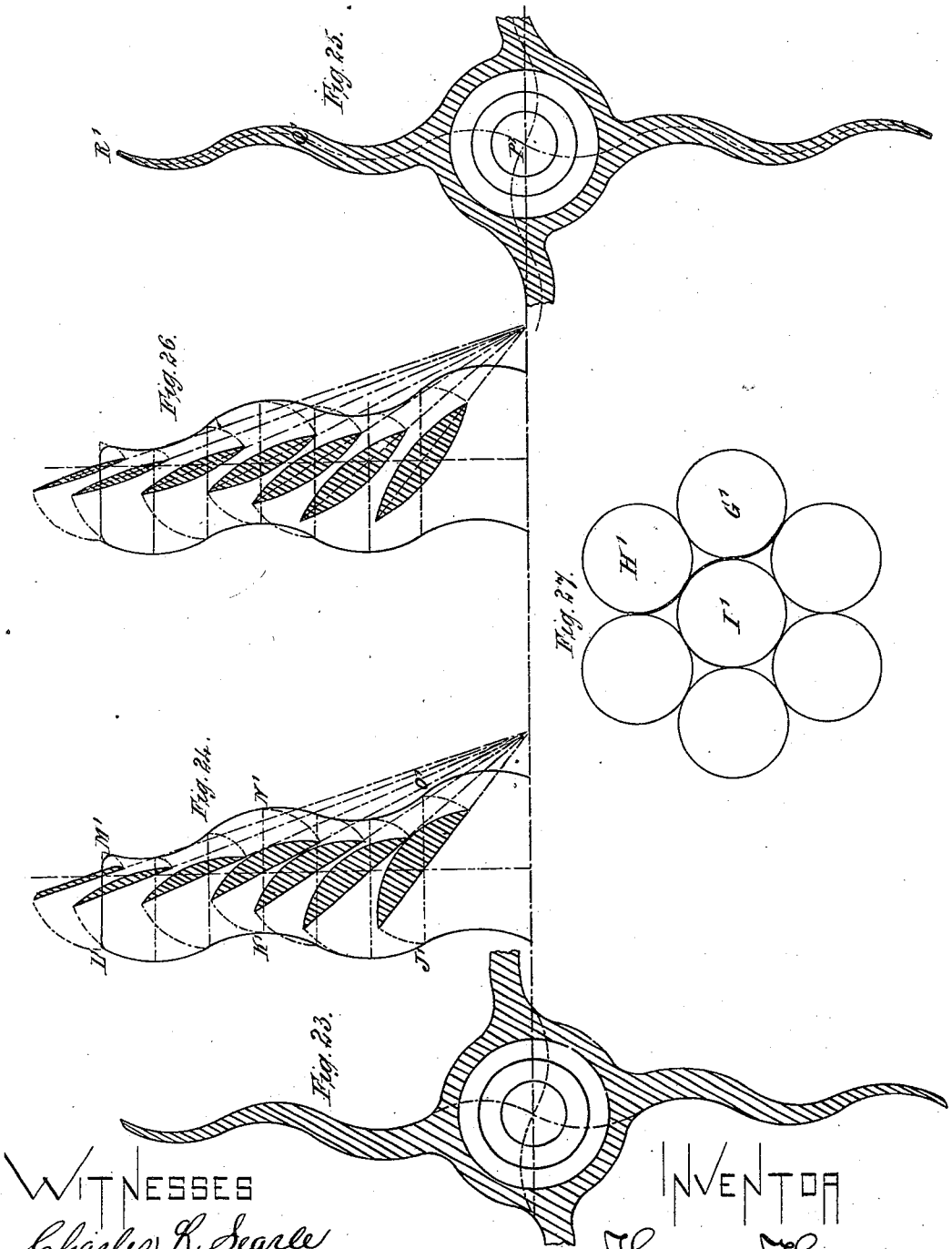

(No Model.) 3 Sheets—Sheet 3.
H. HIRSCH.
SCREW PROPELLER.
No. 246,506. Patented Aug. 30, 1881.
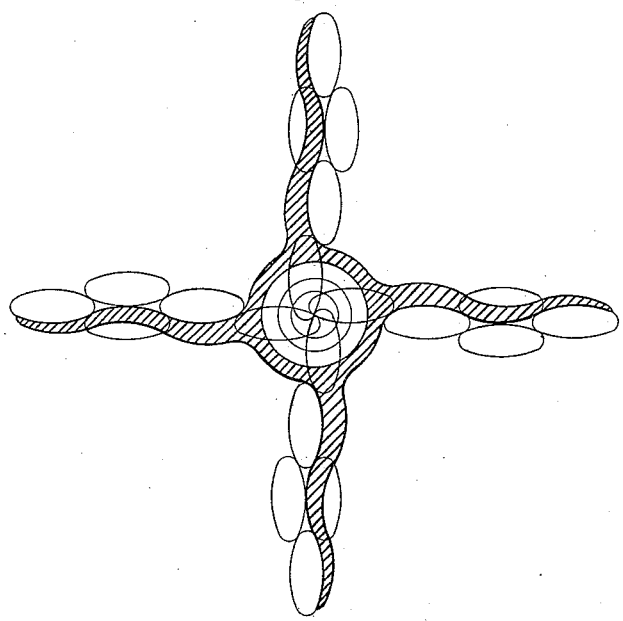
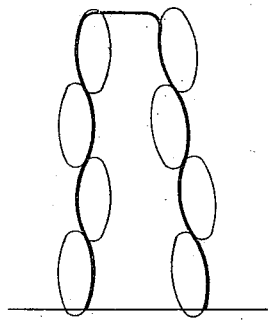
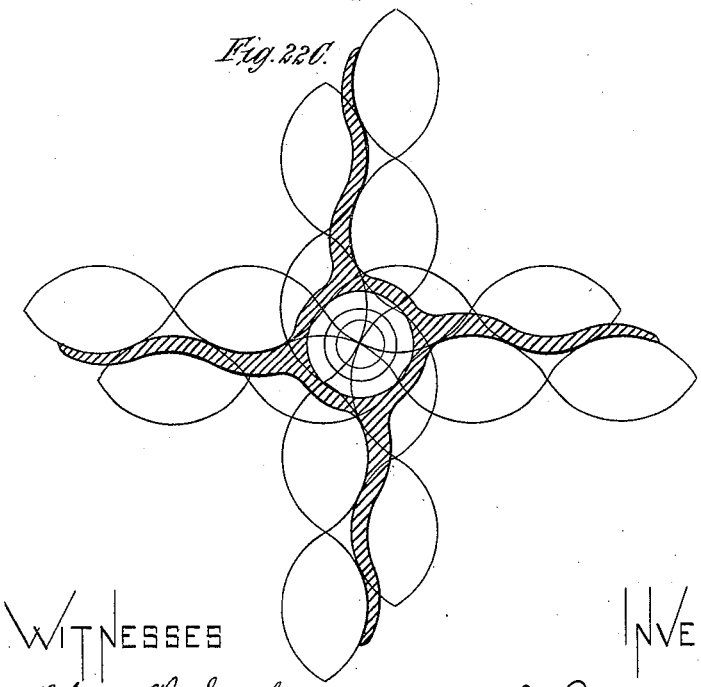
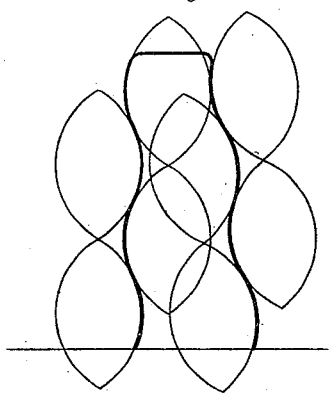

UNITED STATES PATENT OFFICE.

HERMANN HIRSCH, OF 4, 5, AND 6 GREAT SAINT HELENS, COUNTY OF MIDDLESEX, GREAT BRITAIN.

SCREW-PROPELLER.

SPECIFICATION forming part of Letters Patent No. 246,506, dated August 30, 1881.

Application filed May 24, 1881. (No model.) Patented in England June 19, 1880, in Belgium December 17, 1880, and in France December 18, 1880.

*To all whom it may concern:*

Be it known that I, HERMANN HIRSCH, a subject of the Emperor of Germany, residing at 4, 5, and 6 Great Saint Helens, in the county of Middlesex, Kingdom of Great Britain and Ireland, have invented new and useful Improvements in Screw-Propellers, (for which I have obtained a patent in Great Britain, No. 2,498, bearing date June 19, 1880,) of which the following is a specification.

This is a division of an application for patent filed February 11, 1881, serial No. 25,897, which embraced the same subject-matter.

My invention relates to improvements in the shaping and constructing of screw-propellers; and it consists in giving to such structures alternately curved lines or undulated formations such as hereinafter described, and which are designed to afford harmony of contact between the water and the structure therein immersed to allow the water to be displaced with ease and to diminish friction.

Figure 27 represents a group of seven circles having a central one surrounded by six in mutual contact, and also in contact each one with the central circle. The curved line, to whose formation any two adjacent circles of the surrounding six and the central one severally contribute—as, for instance, the circles G' H' I'—defines the germinal curve which I employ in designing the screw-propeller according to my invention. Fig. 21 is an end view of such a propeller, as seen when standing aft and looking forward. The lowest of the four blades here shown is also depicted in longitudinal section. Fig. 22 is a view of the same propeller taken in a plane at right angles to that of Fig. 21. Fig. 23 is a fragmentary sectional view on a plane at right angles to the line of shaft and midway in the length of boss. Fig. 24 shows the expansion of the surface of one blade, such surface being bounded by the line J' K' L' M' N' O'. Fig. 24 also shows cross-sections of the same blade at seven positions of its length. Figs. 25 and 26 are views of a propeller taken in precisely the same directions as those of Figs. 23 and 24, respectively; but in this case the forward and back faces of the blade are curved, as shown by the cross-sections, the material of such blade being equally distributed on either side of the normal axial line P' Q' R'.

It will be observed that a curvature akin to that illustrated by the thick line on Fig. 27 pervades the blade in the direction from the boss to the periphery, while the forward and after edges of such blade have imparted to them a like curvature, as shown by lines M' N' O' and L' K' J'.

It is to be understood I do not confine myself to any particular number of blades or to any constancy of pitch throughout the length of any one blade. Also, though preferring to incline the "leading" edge of each blade aft, I do not restrict myself thereto; nor do I limit myself to any angle of deviation from a line perpendicular to the shaft in respect of either the leading edge or the trailing edge. Furthermore, the blades may be, as actually shown, of tapering breadth from the boss to the periphery, or may be parallel, and the thicknesses may be arranged according to either of the plans shown or otherwise.

Having described the nature of my said invention, and explained in what manner the same is to be or may be performed or carried into practical effect, I would have it understood that, although I have described and shown the undulated surfaces and edges as being composed of arcs of circles, in compliance with the normal diagram shown, yet other curves of approximate contour (including, for example, portions of ellipses) may, in some cases, be adopted for any or all of the constituent elements of such undulated surfaces (see, for examples, Figs. 22A, 22B, 22C, and 22D) according to my invention, the object being, as I have already stated, to afford harmony of contact with the water. Also, I would remark that the number of undulations may be varied to suit the circumstances of particular applications without departure from the essential characteristics of my invention; as respects which,

What I claim as novel and original is as follows:

A screw-propeller blade having an undulated contour in both directions of its length and on all sides, substantially as set forth.

HERMANN HIRSCH.

Witnesses:
 GEORGE WALKER,
 PHILIP WALKER.